United States Patent [19]

Loizeau et al.

[11] Patent Number: 4,718,530
[45] Date of Patent: Jan. 12, 1988

[54] TORSIONAL DAMPER

[75] Inventors: Pierre Loizeau, Ville D'Avray; Philippe Lhermite, Senlis, both of France

[73] Assignee: Valeo, Paris, France

[21] Appl. No.: 610,513

[22] Filed: May 15, 1984

[30] Foreign Application Priority Data

May 16, 1983 [FR] France .................. 83 08046

[51] Int. Cl.⁴ .............................................. F16D 3/66
[52] U.S. Cl. ........................ 192/106.2; 192/106.1; 464/68
[58] Field of Search ............... 192/70.17, 106.1, 106.2; 464/66, 67, 68

[56] References Cited

U.S. PATENT DOCUMENTS

| | | | |
|---|---|---|---|
| 1,642,475 | 9/1927 | Wood | 192/106.1 |
| 1,997,021 | 4/1935 | Spase | 192/106.1 X |
| 2,114,247 | 4/1938 | Davis | 192/106.1 |
| 4,210,234 | 7/1980 | Jones | 192/106.1 |
| 4,300,670 | 11/1981 | Mathues | 192/106.1 |
| 4,480,736 | 11/1984 | Loizeau | 192/106.1 |
| 4,496,036 | 1/1985 | Loizeau | 192/106.2 |

FOREIGN PATENT DOCUMENTS 2499181 8/1982 France .

Primary Examiner—Rodney H. Bonck
Assistant Examiner—Richard M. Lorence
Attorney, Agent, or Firm—Charles E. Brown; Charles A. Brown

[57] ABSTRACT

The circumferentially acting elastic cushion disposed between two coaxial parts of a torsional damper comprises at least one elastically deformable arm. This is attached at one end to the annular flange of one of the coaxial parts. Its other end is unsupported and has a shoulder adapted to engage another shoulder provided for this purpose on the other of the two coaxial parts.

13 Claims, 28 Drawing Figures

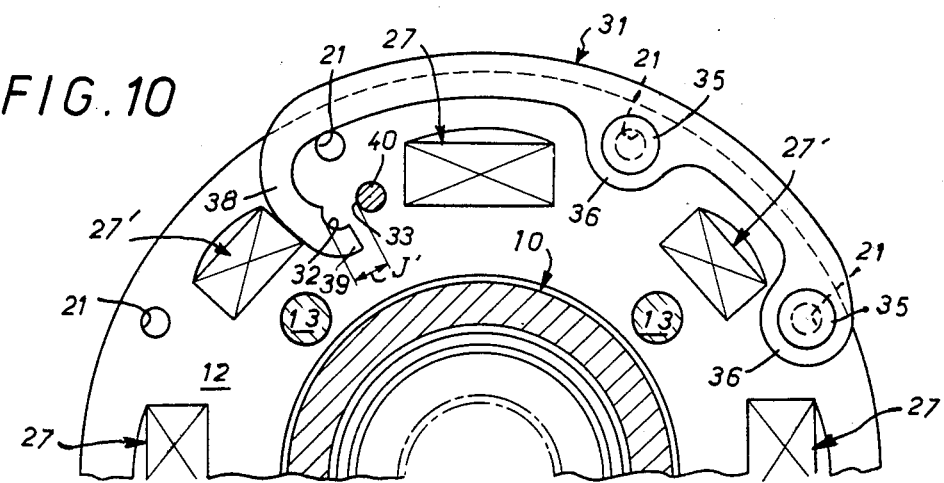
FIG.10
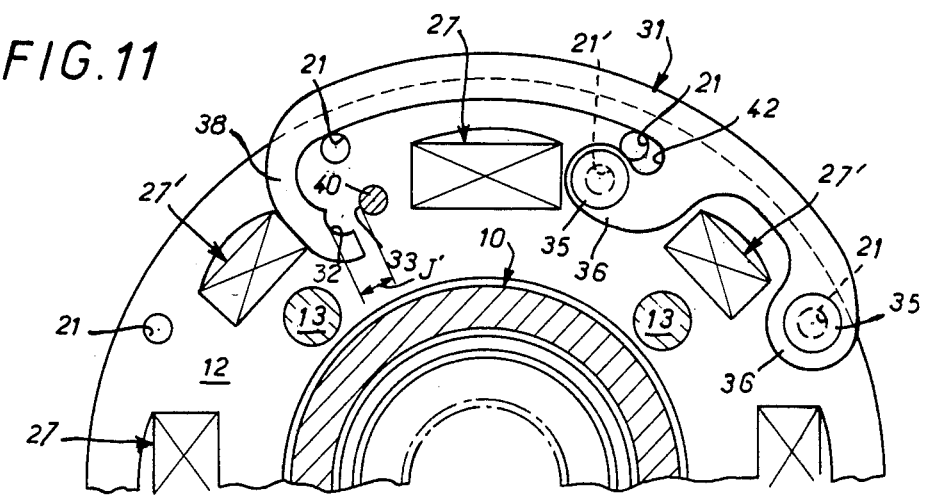
FIG.11
FIG.12  FIG.13A  FIG.13B  FIG.14
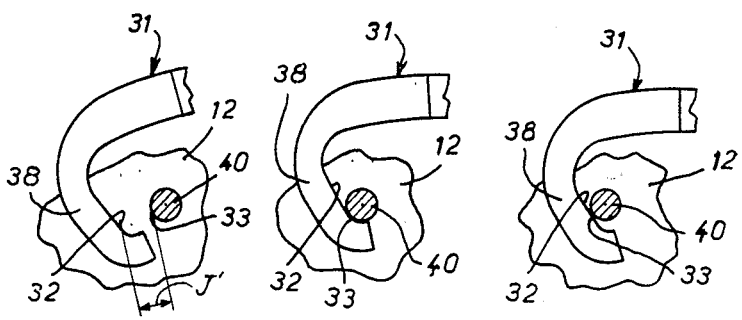

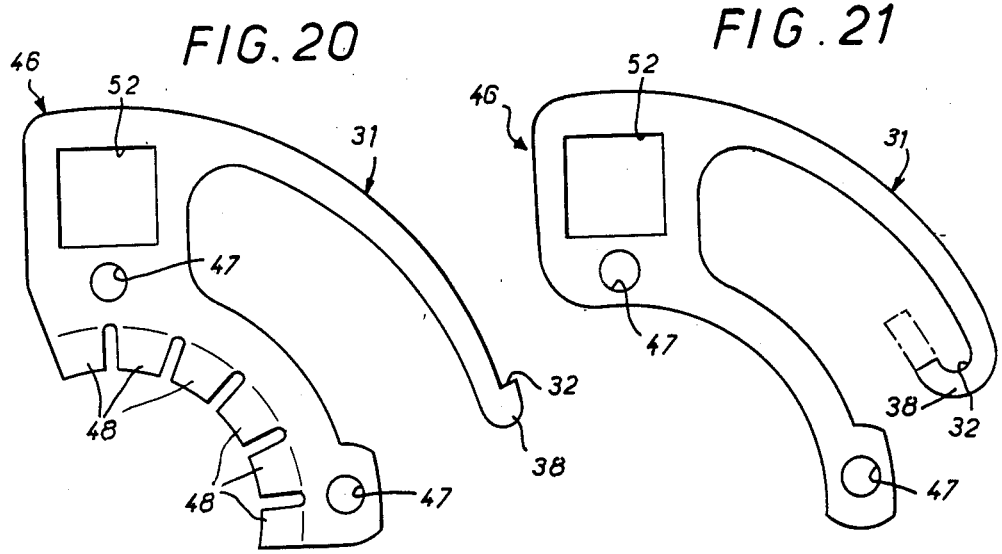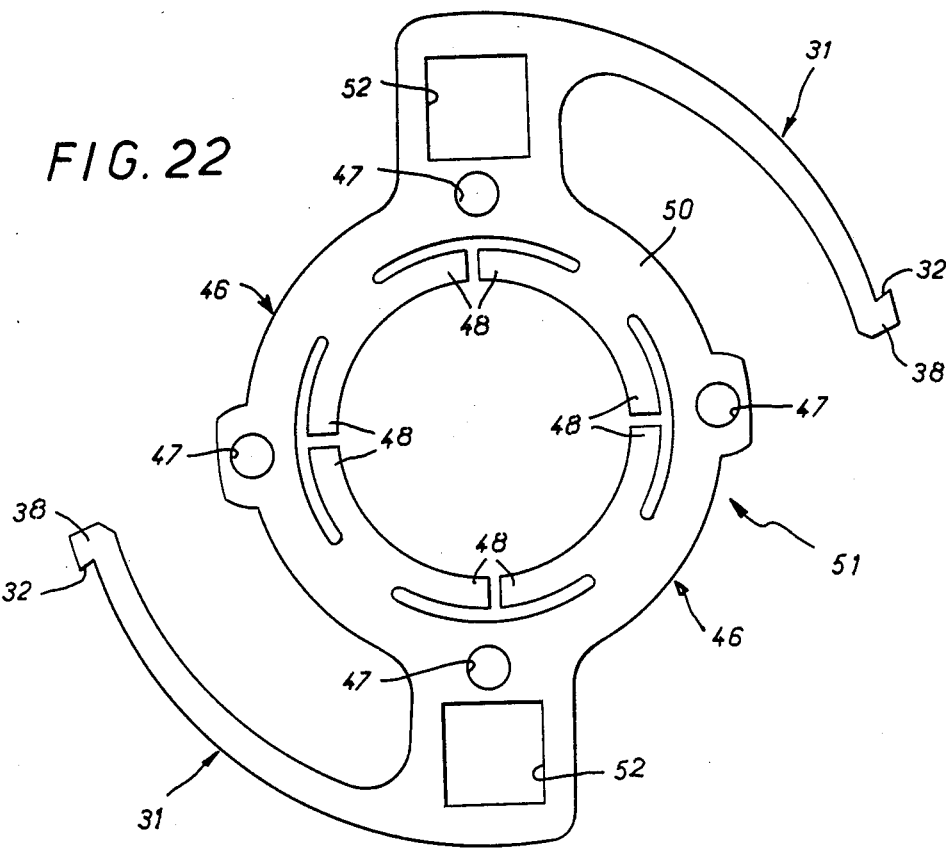

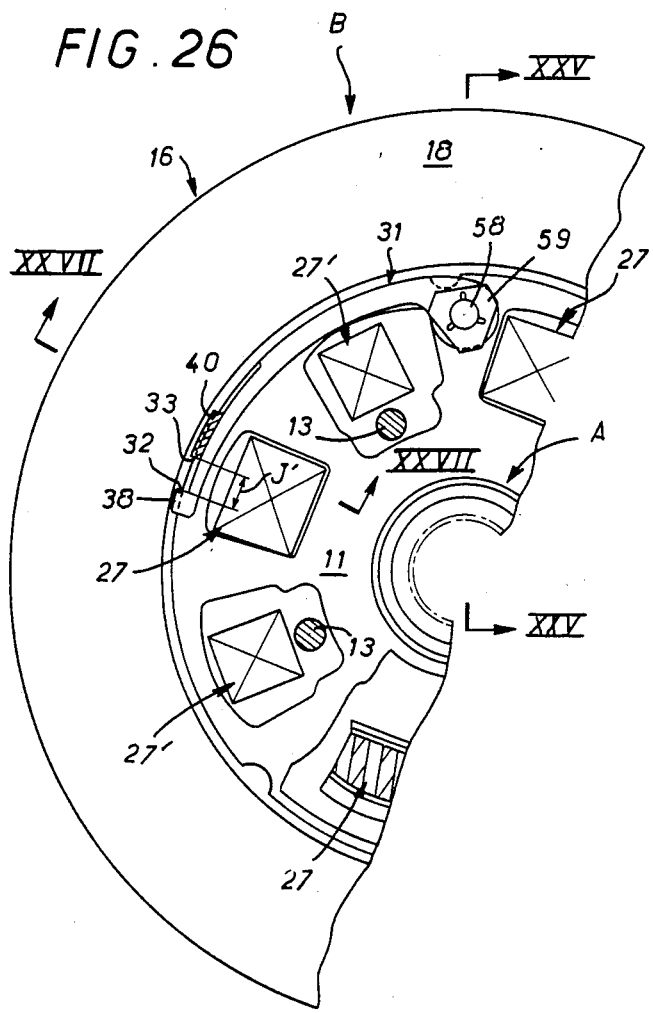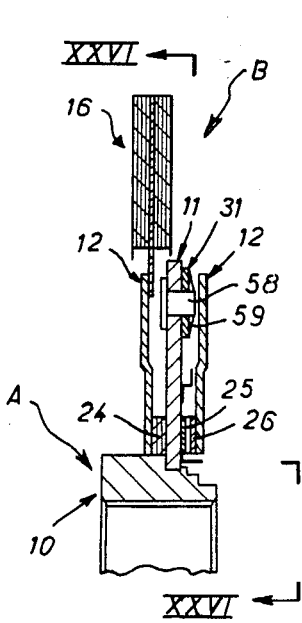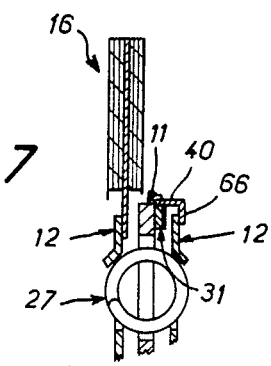

TORSIONAL DAMPER

BACKGROUND OF THE INVENTION

1. FIELD OF THE INVENTION

The present invention concerns a torsional damper comprising at least two coaxial parts mounted to rotate relative to one another within a defined range of relative angular movement and circumferentially acting elastic means between said parts resisting such relative angular movement over at least part of said range of relative angular movement.

2. DESCRIPTION OF THE PRIOR ART

This type of torsional damper is normally incorporated in the design of a friction clutch, particularly for automotive vehicles, in which case one rotating part comprises a friction disk designed to rotate with a first shaft, in practice a driving shaft and the motor output shaft in the case of an automotive vehicle, whereas another of said rotating parts is carried on a hub designed to rotate with a second shaft, in practice a driven shaft and the gearbox input shaft in the case of an automotive vehicle.

This type of torsional damper is used to permit regulated transmission of rotational torque applied to one of its rotating parts where the other is itself subject to a rotational torque. It is thereby able to filter vibrations which may arise at any point in the kinematic system in which it is incorporated, extending from the motor to the driven road wheels in the case of an automotive vehicle.

The present invention is more particularly directed to the case where at least one of the two coaxial parts comprises a transverse annular flange, in the form of a hub flange or guide ring.

In practice, each of the two coaxial parts normally comprises an annular flange of this kind. For example, a first of the coaxial parts may comprise a hub flange, usually coupled to a hub, whereas the other comprises two spaced parallel guide rings attached together by spaced axial spacers, one on each side of the hub flange; in the case of a friction clutch for automotive vehicles, it is then to one of these guide rings that the friction disk is usually attached, this guide ring having for this purpose circumferentially spaced holes each adapted to have a fixing means, such as a rivet, for example, pass through it, and by means of which a friction disk of this kind is thus attached to it.

However, a reverse arrangement is also possible in which the two guide rings are coupled to the hub whereas the hub flange, unrestricted relative to said hub, carries the friction disk.

More often than not, the circumferentially acting elastic means employed consist of elastic members such as helical coil springs or elastomer blocks, for example, extending tangentially relative to a circumference of the assembly and the two coaxial parts concerned have registering openings adapted to accommodate these elastic members.

In practice, these openings consist of windows formed for this purpose in the annular flanges of said coaxial parts and there are provided a number of separate groups of elastic members having different stiffnesses, the coming into action of which during relative angular movement between said coaxial parts being modulated by appropriate differences between the circumferential dimensions of the corresponding windows, the elastic members of less stiffness being the first to come into action before the effect of the elastic members of higher stiffnesses is successively added to them.

It has already been proposed, as described in U.S. patent application Ser. No. 317,175 dated Nov. 2, 1981, now U.S. Pat. No. 4,496,036, to replace the elastic members of lower stiffness with elastically deformable arms superposed in the axial direction on the coaxial parts concerned and adapted to act in the circumferential direction between the latter.

As soon as relative angular movement between these coaxial parts begins, these elastically deformable arms come into action, acting alone at this time; at later stages of this relative angular movement other elastic members, of greater stiffness, add their effect to those of the arms and it is essentially these latter elastic members which give the torsional damper its torque transmission capacity in the final stage of such relative angular movement.

It has also been proposed, as described in U.S. patent application Ser. No. 343,578 dated Jan. 28, 1982, now U.S. Pat. No. 4,480,736, to use elastically deformable arms adapted to come into action during the final phases of the relative angular movement between the coaxial parts concerned, each of these elastically deformable arms being supported at one end by one of said coaxial parts while the other end is unsupported and features a shoulder through which it is adapted to engage with a shoulder provided for this purpose on the second of said coaxial parts.

Unlike the previous arrangement, it is then necessary, with an arrangement of this kind, for a certain degree of relative angular movement to have already occurred between the coaxial parts concerned before, these shoulders then coming into engagement with one another, the elastically deformable arms employed come into action, and the torque transmission capacity of the assembly in the final stage of said relative angular movement is then essentially due to these arms.

These arrangements are satisfactory.

However, in practice, the second at least is highly specific to the particular torsional damper concerned.

The latter must therefore be designed according to the intended application.

A general problem which arises in designing torsional dampers of the kind under discussion is to optimize the standardization of the component parts, whatever the specific application conditions, so as to minimize costs.

Incidentally, this is the reason why, in the case of a friction clutch for automotive vehicles, when one of said coaxial component parts of a torsional damper of this kind comprises, independently of the hub, two annular flanges forming guide rings, these guide rings are identical and both have circumferentially spaced holes for attaching a friction disk, although only one of them is in reality intended to carry a friction disk of this kind.

As a corollary to this, and for the same reasons, it is beneficial to use identical guide rings for different applications, in spite of them then having the same arrangement of windows for accommodating elastic members.

In the case of an automotive vehicle marketed in two versions, a standard version and a turbocharged version, for example, the torsional damper used in the turbo version must have increased torque transmission capacity in the final stage of relative angular movement between the two coaxial parts which constitute it.

Likewise, it may be beneficial to be able to fit an automotive vehicle with a friction clutch providing different torque transmission capacities when the torque is increasing and when the torque is decreasing.

A general objective of the present invention is to provide an arrangement which can meet such objectives whilst also satisfying the requirements for standardization.

SUMMARY OF THE INVENTION

The present invention consists in a torsional damper suitable for use in a friction clutch, comprising at least two coaxial parts mounted to rotate relative to one another within a defined range of relative angular movement, at least one annular flange on a first of said coaxial parts, circumferentially acting elastic means between said coaxial parts resisting such relative angular movement over at least part of said defined range of relative angular movement and incorporating at least one elastically deformable arm which extends in a substantially circumferential direction, which is supported at a first end on said annular flange of said first coaxial part and which is unsupported at its second end, a first shoulder on said second end of said at least one elastically deformable arm, and a second shoulder on a second of said coaxial parts with which said first shoulder is adapted to engage.

In practice, an elastically deformable arm of this kind is fitted or not according to whether or not additional torque transmission capacity is required in the final stage of relative angular movement between the two coaxial parts constituting the torsional damper, or whether or not there is a requirement for different torque transmission capacities with the torque increasing and decreasing.

However, in both cases, the other component parts of the torsional damper advantageously remain the same.

In particular, the annular flange to which the elastically deformable arm employed must be attached remains unchanged, whether the annular flange is to be fitted to a normal version torsional damper, without an elastically deformable arm of this kind, or to an optional version torsional damper, including an elastically deformable arm of this kind.

In accordance with one feature of the invention more particularly directed to friction clutches for automotive vehicles, in the case where the coaxial part carrying the elastically deformable arm employed comprises two spaced parallel annular flanges which are identical to one another and feature circumferentially spaced holes each adapted to have a fixing means passed through it, and to one of which a friction disk is attached by means of said holes, said elastically deformable arm is attached to the other annular flange, by means of at least one of the holes in the latter, these registering with those in the former.

Thus in this case benefit is advantageously taken, for the purposes of attaching the elastically deformable arm employed, of the holes already present, for reasons explained already, in that of the annular flanges which does not carry the friction disk, and which are normally not used.

However, if required, the elastically deformable arm employed may also be attached, by means of these same holes, to the annular flange which carries the friction disk, or to the annular flange of the other associated coaxial part.

In all cases, coming into action in the final stage of relative angular movement between the coaxial parts concerned, whether with increasing or decreasing torque, it provides for increasing the torque transmission capacity of the torsional damper to which it is fitted, as required, without modification to the other component parts of the latter, and without interference with these other component parts, in particular, without interference with the other elastic members which a torsional damper of this kind features.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIGS. 10 and 11 are partial views analogous to that of FIG. 6 and concerning respective alternative embodiments.

FIG. 12 is a partial view analogous to that of FIG. 6 and concerning a further embodiment.

FIGS. 13A and 13B are views analogous to that of FIG. 12 and illustrate the functioning of this embodiment.

FIG. 14 is a view analogous to that of FIG. 3, for a still further embodiment.

FIGS. 20, 21 and 22 are views analogous to that of FIG. 19 and relating to respective alternative embodiments.

FIG. 25 is partial view analogous to that of FIG. 2, in cross-section on the line XXV—XXV in FIG. 26, and concerning another embodiment.

FIG. 26 is partially cut away partial view in plan of this embodiment as seen on the broken line XXVI—XXVI in FIG. 25.

FIG. 27 is partial view in axial cross-section on the line XXVII—XXVII in FIG. 26 of this embodiment.

DESCRIPTION OF THE PREFERRED EMBODIMENTS

Figure 1:
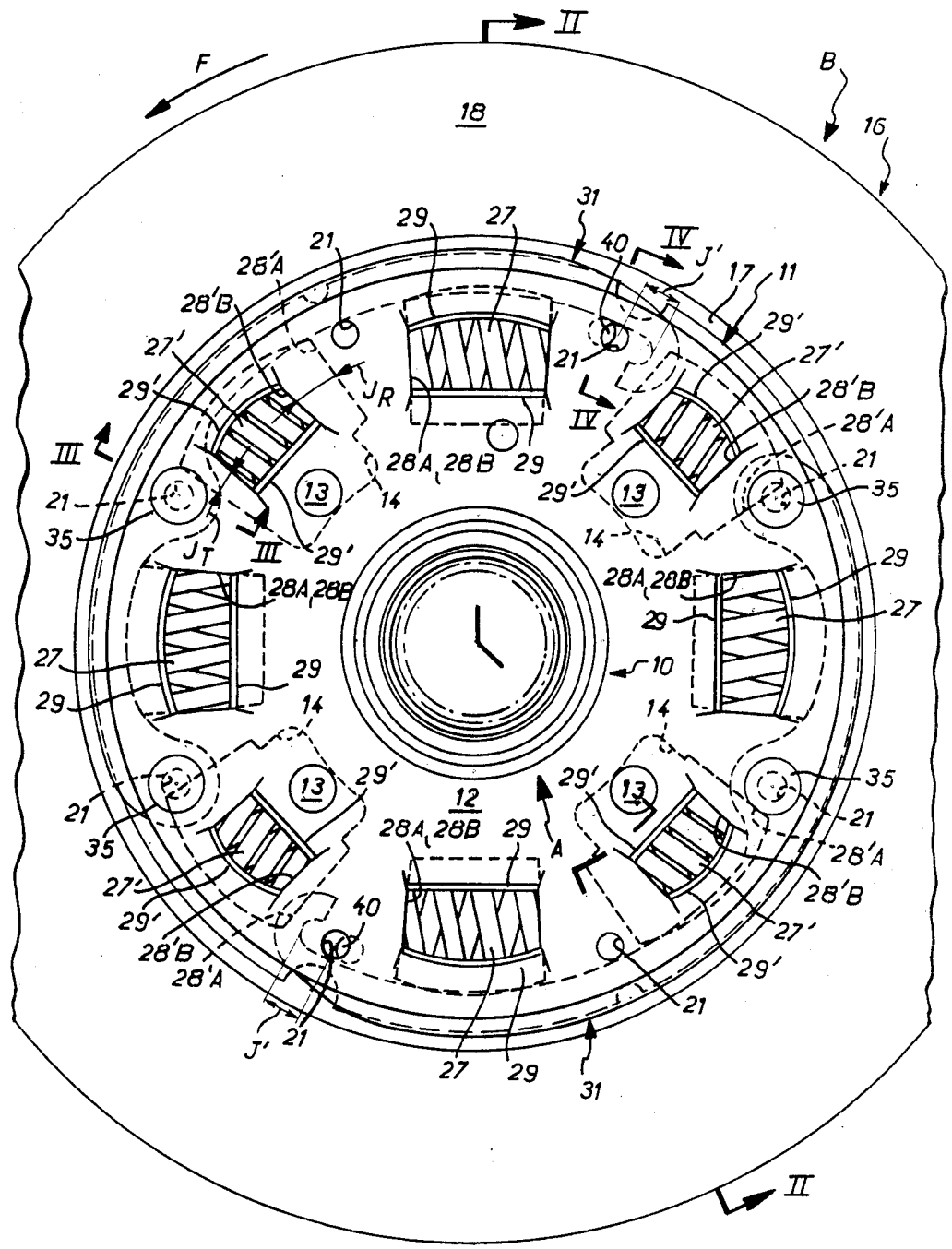
FIG. 1 is a partial view in elevation of a torsional damper in accordance with the invention as seen in the direction of the arrow I in FIG. 2.
Figure 2:
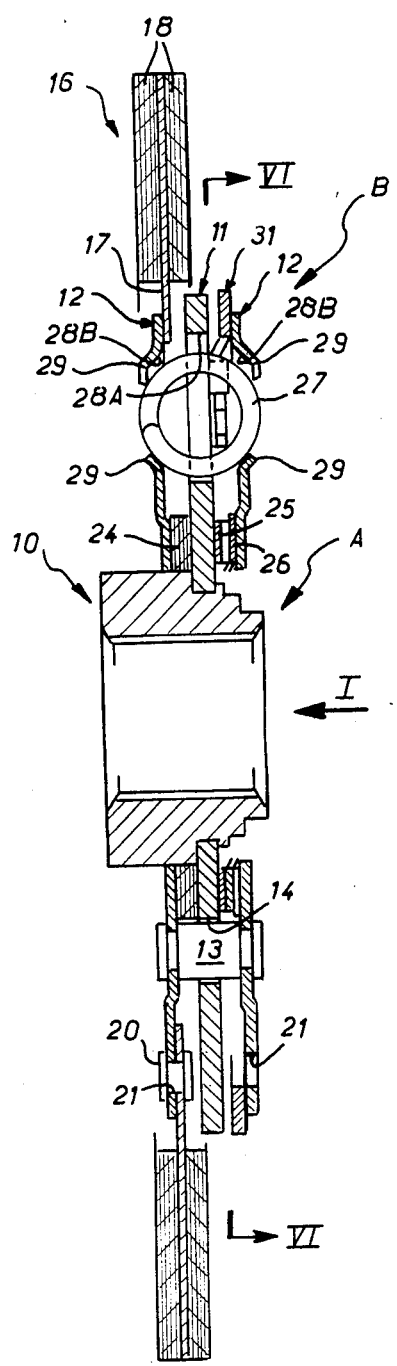
FIG. 2 is a view of it in axial cross-section on the broken line II—II in FIG. 1.
Figure 3:
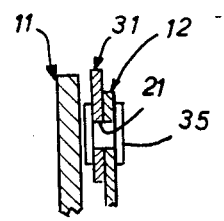
FIGS. 3 and 4 are further, partial views of it in axial cross-section on the respective lines III—III and IV—IV in FIG. 1.
Figure 4:
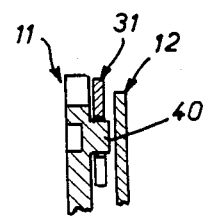

In the figures, the torsional damper to which the invention is applied constituents, by way of example, a damper hub friction clutch for an automotive vehicle.

Generally speaking, this torsional damper comprises two coaxial parts A and B, one driving and the other driven, mounted to rotate relative to one another within a defined range of relative angular movement and, as will be described in detail hereinafter, against the action of circumferentially acting elastic means operative between them over part at least of said defined range of relative angular movement.

In the various embodiments shown, the coaxial part A comprises a hub 10 which, internally splined, is designed to rotate with a shaft, in practice a driven shaft and the gearbox input shaft in the case of an automotive vehicle. It further comprises a transverse annular flange 11, known as the hub flange, which is constrained to rotate with the hub 10 and which is attached to the latter by crimping, for example, as shown here.

Conjointly, the coaxial part B comprises at least one transverse annular flange (or guide ring) 12.

In the various embodiments shown, the coaxial part B comprises two spaced parallel guide rings 12, one on each side of and spaced from the hub flange 11, attached to one another by spacers 13 at a number of points.

These spacers, which extend in the axial direction, pass with clearance through holes 14 provided for this purpose, in a manner to be described in more detail hereinafter, in the hub flange 11.

As this is a friction clutch for automotive vehicles, the coaxial part B further comprises a friction disk assembly 16, the disk 17 of which is in contact with one of the guide rings 12, on the side of the latter facing the hub flange 11, being attached to this guide ring in a manner to be described in more detail hereinafter. By means of friction facings 18 fastened to each side of the perimeter of the disk 17, the friction disk assembly 16 is designed to be clamped between two plates which are designed to rotate with a shaft, in practice a driving shaft and the motor output shaft in the case of an automotive vehicle.

In practice, in the various embodiments shown the disk 17 of the friction disk assembly 16 is attached to the guide ring 12 against which it lies by rivets 20.

To this end, this guide ring 12 has at its periphery circumferentially spaced holes 21 each adapted to have a rivet 20 passed through it.

It is therefore by means of these holes 21 that the friction disk assembly 16 is attached to it.

For the reasons of standardization discussed hereinabove, the two guide rings 12 are identical to one another.

Consequently, the guide ring 12 opposite that carrying the friction disk assembly 16 also has at its perimeter circumferentially spaced holes 21 each adapted to have any form of fixing means passed through it.

Disposed between the resulting coaxial parts A and B in the axial direction are friction means.

In the various embodiments shown, these comprise, on a first side of the hub flange 11, between the latter and the guide ring 12 carrying the friction disk assembly 16, a first friction ring 24 and, on the side opposite said hub flange 11, between the latter and the other guide ring 12, a second friction ring 25.

The assembly is clamped up by axially acting elastic means.

In the embodiment shown in FIGS. 1 to 9, these consist of an axially acting corrugated spring washer 26 of the kind available under the trade name "ONDU-FLEX", for example, inserted axially between the friction ring 25 and the guide ring 12 with which the latter is associated.

These arrangements are well known per se and, not constituting part of the present invention, will not be described in further detail here.

In a manner also known per se, the circumferentially acting elastic means disposed between the coaxial parts A and B are divided, in the various embodiments shown, into a number of damper stages of differing stiffness.

In practice, in these embodiments, there is thus provided a first damper stage, of relatively low stiffness, which is the only one to come into action at the beginning of relative angular movement between the coaxial parts A and B, and a second damper stage, of relatively high stiffness, the effects of which are added to those of the first above a particular value of such relative angular movement.

The circumferentially acting elastic means of the first damper stage comprise a plurality of elastic members 27 extending substantially tangentially to a circumference of the assembly.

In practice, these are helical coil springs.

In the various embodiments shown, there are four of these elastic members 27 disposed circumferentially in pairs at 90° to one another.

To accommodate them, the coaxial parts A and B comprise registering openings 28A and 28B in which they are individually disposed.

In practice, these are windows 28A formed to this end in the hub flange 11 of the coaxial part A and windows 28B formed to this end in the guide rings 12 of the coaxial part B, the latter having retaining lips 29 along their circumferential edges.

All these windows 28A and 28B have the same circumferential dimension.

Similarly, the circumferentially acting elastic means of the second damper stage comprise a plurality of elastic members 27', in practice helical coil springs, extending tangentially to a circumference of the assembly.

In the various embodiments shown, there are four of these elastic members 27' disposed circumferentially in pairs at 90° to one another, alternating with the elastic members 27 of the first damper stage.

As previously, to accommodate them, the coaxial parts A and B comprise registering opening 28'A and 28'B formed by windows in the hub flange 11 and the guide rings 12, the latter having retaining lips 29' along their circumferential edges.

However, contrary to the preceding arrangements, the circumferential dimension of the windows 28'A in the hub flange 11 is greater than that of the window 28'B in the guide rings 12 so that, in the rest configuration of the assembly and as shown in FIG. 1, there is a circumferential clearance between the corresponding radial edges of these windows, of valve JT for those of these radial edges which are on the downstream side for the more frequent direction of rotation of said assembly, marked by an arrow F in FIG. 1 and corresponding in practice to forward movement of the automotive vehicle concerned, and of value JR for those of these radial edges which are on the upstream side for the same rotation direction.

In the various embodiments shown, the clearance JT is effective on functioning of the assembly with increasing torque. As measured in the circumferential direction, it is less than the clearance JR which is effective in operation with decreasing torque.

Also, in these embodiments, the openings 14 which the hub flange 11 comprises for the passage of the axial spacers 13 connecting the guide rings 12 to one another consist of respective radial extensions of the windows 28′A in the hub flange 11, each being of sufficient size in the circumferential direction for the clearance on each side of each axial spacer 13 in the rest configuration of the assembly, as measured in the circumferentional direction, to be greater than the aforementioned clearances JT and JR.

In FIGS. 6, 8, 10, 11, 16, 24 and 26 the elastic members 27 and 27′ are shown only schematically, by means of their contour, in order to simplify the figures.

The circumferentially acting elastic means of the second damper stage further comprise, for at least one direction of rotation, at least one elastically deformable arm 31 which extends generally circumferentially and which is supported at one end by one of the coaxial parts A and B while at the other end it is unsupported and features a shoulder 32 by means of which it is adapted to be engaged with a shoulder 33 provided for this purpose on the second of said coaxial parts A and B.

In practice, in the various embodiments shown, two elastically deformable arms 31 are provided, in positions which are substantially diametrically opposed to one another. They are intended to act only for the direction of rotation of the assembly marked by the arrow F in FIG. 1 which, as mentioned hereinabove, corresponds to operation of said assembly with increasing torque.

In accordance with the invention, each of the elastically deformable arms thus employed is attached, in practice at will, to one annular flange 11 or 12 of the coaxial part A or B which carries it.

In the embodiment shown in FIGS. 1 to 10, the elastically deformable arms 31 are carried by the coaxial part B and they are attached to the guide ring 12 of the latter opposite that carrying the friction disk assembly 16.

In practice, an elastically deformable arm 31 of this kind is attached to this guide ring 12 by means of one at least of the holes 21 which the latter features at its periphery for the reasons explained hereinabove.

In the embodiment shown in FIGS. 1 to 10, two holes 21 in the guide ring 12 concerned are used in this way.

In other words, in this embodiment each of the elastically deformable arms 31 is attached to the guide ring 12 which carries it by two fixing means, in practice rivets 35, circumferentially spaced along this guide ring 12.

Each of the elastically deformable arms 31 is thus attached in such a way that it is prevented from rotating relative to this guide ring 12.

Carried by a guide ring 12 of this kind, it is also constrained to rotate with the latter around the axis of the assembly.

In practice, each of the elastically deformable arms 31 extends over slightly less than 180° at the perimeter of the guide ring 12 which carries it.

To accommodate the rivets 35 which attach it to the latter, it has local radial extensions 36 extending towards the axis of the assembly.

In practice, the shoulder 32 at the free end of each of the elastically deformable arms 31 forms part of a finger 38 on the elastically deformable arm 31 extending generally radially in the direction towards the axis of the assembly.

In the embodiment shown in FIGS. 1 to 10, this finger 38 features, parallel to the elastically deformable arm 31 of which it forms part, a circumferential tip 39 so that its overall configuration is that of a hook, the corresponding shoulder 32 being formed in the hollow part thereof.

As a corollary to this, the shoulder 33 which the coaxial part A features for the purposes of cooperation with the shoulder 32 on the elastically deformable arm 31 is formed on a shoulder member 40 which is attached to the annular flanges or hub flange 11 which this coaxial part A features and projects axially from the latter, in the direction towards the guide ring 12 carrying the elastically deformable arm 31 (FIGS. 1 to 10).

In the embodiment shown in FIGS. 1 to 10, the shoulder member 40 has a circular contour, the associated shoulders 32 and 33 being semi-circular.

Figure 5:
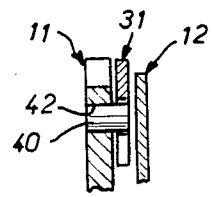
FIG. 5 is a view analogous to that of FIG. 4 and concerning an alternative embodiment.

It may comprise a peg formed integrally with the hub flange 11, by appropriate stamping of the latter (FIG. 4) or a peg attached to the hub flange 11 by means of a hole 42 formed in the latter for this purpose (FIG. 5).

Figure 7:
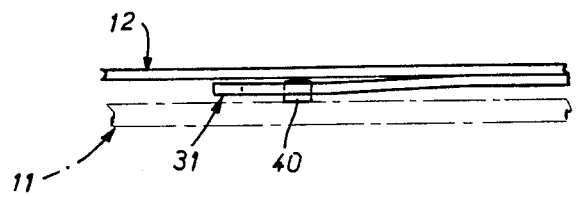
FIG. 7 is a partial plan view of this torsional damper in the direction of the arrow VII in FIG. 6.

Be this as it may, as is most clearly shown in FIG. 7 in the case of one of them, each of the elastically deformable arms 31, the fixed end of which lies against the guide ring 12 which carries it, is bent at its free end away from this guide ring 12 so as to be capable of cooperating with the corresponding shoulder member 40 in a region of the latter situated as close as possible to the hub flange 11.

In the embodiment shown in FIGS. 1 to 10, the shoulder member 40 is also as close as possible in the radial direction to the elastically deformable arm 31 with which it is associated, in contact with the radially innermost circumferential edge of the latter.

Be this as it may, in the rest configuration of the assembly there is a circumferential clearance J′ between the shoulder 32 on an elastically deformable arm 31 and the shoulder 33 on the corresponding shoulder member 40. As measured in the circumferential direction, this clearance J′ is greater than the clearance JT specified previously.

As will be noted, taken as a whole and including the extension 36 and finger 38, each of the elastically deformable arms 31 is spaced away from the openings 28A, 28B, 28′A and 28′B in the parts A and B concerned and thus from the corresponding elastic members 27 and 27′, and does not interfere with the latter; thus it may constitute an optional fitting for the torsional damper concerned.

In operation with the assembly rotating in the direction indicated by the arrow F in FIG. 1 and with the torque increasing, when torque is applied to the coaxial part B the elastic members 27 yield elastically, immediately and alone during a first phase of operation.

Figure 9:
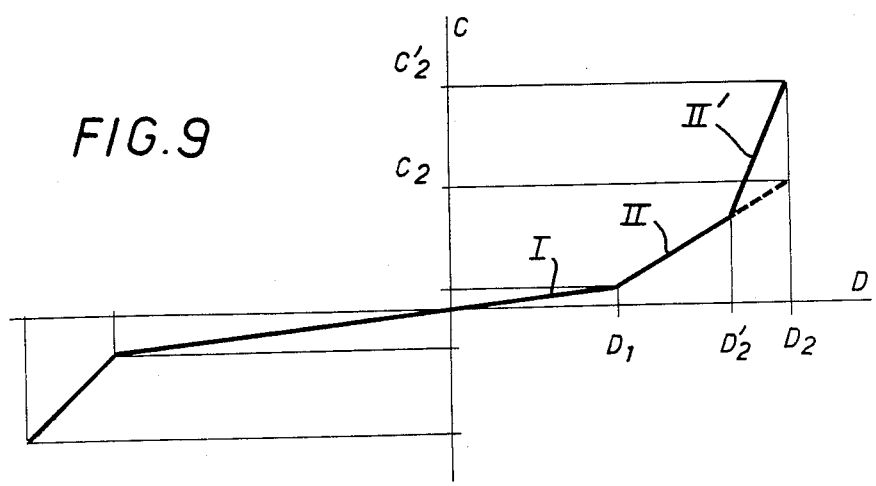
FIG. 9 is a diagram illustrating the functioning of the latter.
Figure 16:
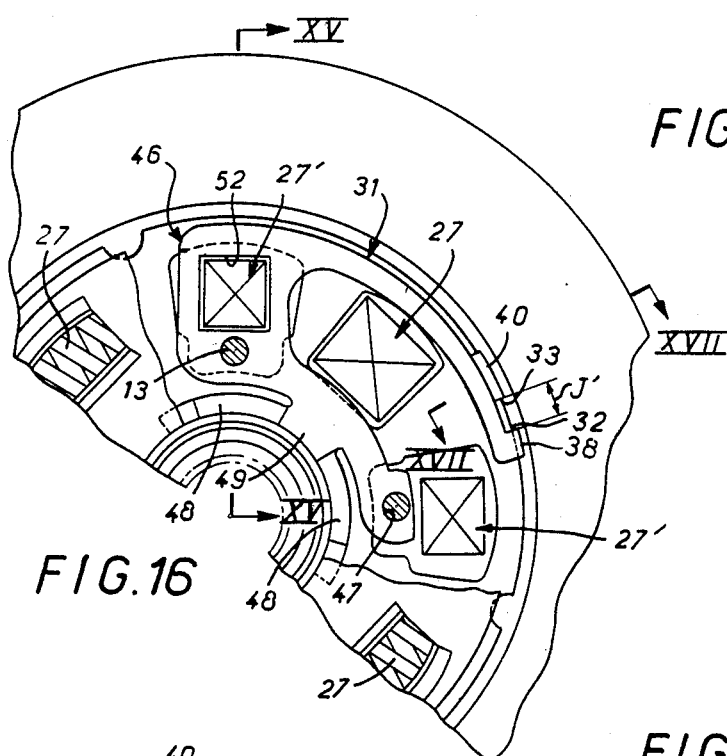
FIG. 16 is a partially cutaway view in elevation of this embodiment as seen on the broken line XVI—XVI in FIG. 15.
Figure 15:
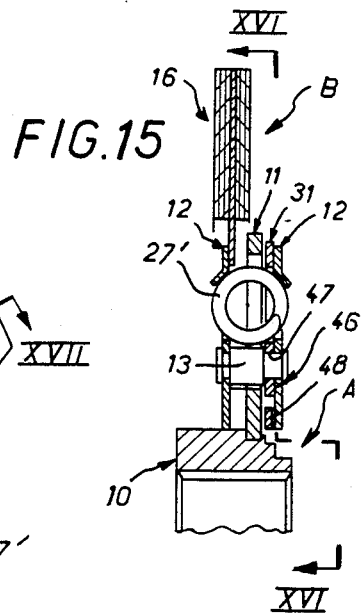
FIG. 15 is a partial view analogous to that of FIG. 2, in cross-section on the line XV—XV in FIG. 16, and concerning a yet further embodiment.
Figure 18:
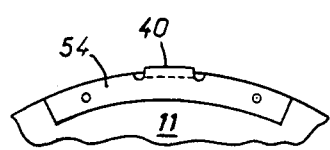
FIG. 18 is another partial view of it in elevation, as seen in the direction of the arrow XVIII in FIG. 17.
Figure 17:
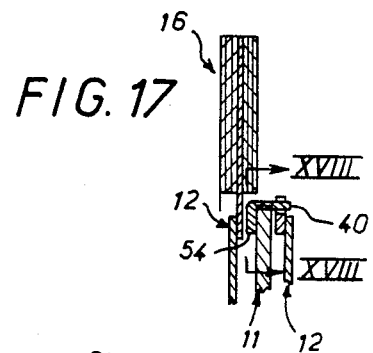
FIG. 17 is a partial view of this embodiment in axial cross-section on the line XVII—XVII in FIG. 16.

FIG. 9 is a diagram plotting the relative angular movement D between the driving coaxial part B and the driven coaxial part A along the abscissae as a function of the torque C transmitted from one of these coaxial parts to the other along the ordinates. This first phase of operation is represented by a straight line I with a slope proportional to the stiffness of the elastic members 27.

This first phase of operation continues until, at a value D1 of the relative angular movement D, the downstream circumferential end of each of the elastic members 27' comes into contact with the corresponding downstream radial edge of the windows 28'A in the hub flange 11 in which these elastic members 27' are accommodated.

The latter then begin to act, their effect being added to that of the previous elastic members 27. On the diagram in FIG. 9 the curve representing this second phase of operation is a straight line II with a slope proportional to the combined stiffness. In the absence of the elastically deformable arms 31 employed in accordance with the invention, and as represented schematically in dashed line in the diagram in FIG. 9, this second phase of operation continues uninterrupted until, at a value D2 of the relative angular movement D, the coaxial part A is driven directly by the coaxial part B, either because at least one of the elastic members 27, 27' is then fully compressed or because at least one of the axial spacers 13 has come into contact with the corresponding radial edge of the opening 14 in the hub flange 11 through which it passes.

Given this eventuality, the torque transmitted from the coaxial part B to the coaxial part A has a value C2 for this value D2 of the relative angular movement between said coaxial parts A and B, for example.

If this direct driving of the coaxial part A by the coaxial part B is effected through contact of the axial spacers 13 with the hub flange 11, more often than not such contact will be provided by one only of these axial spacers 13, or a limited number thereof, because of the inevitable manufacturing tolerances.

There may result a tendency for the axial spacer(s) 13 thus affected to become bent, prejudicing the service life of the assembly.

Figure 8:
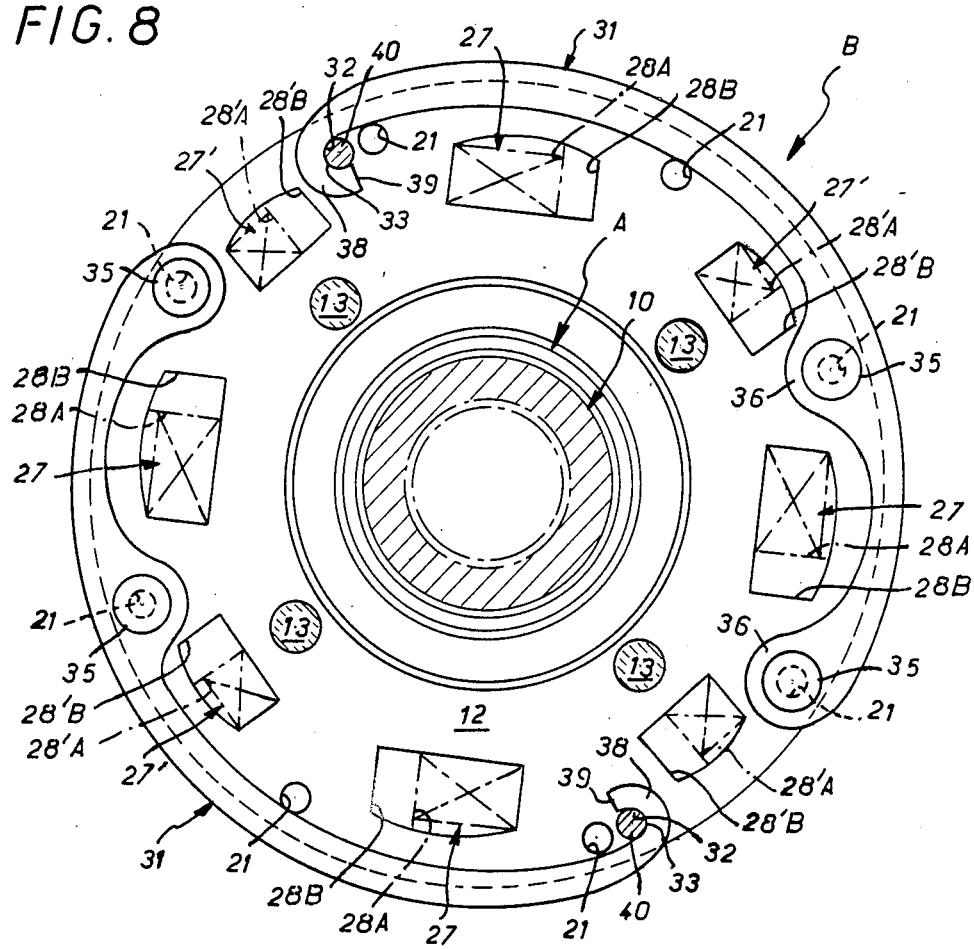
FIG. 8 is a view analogous to that of FIG. 6, for a service configuration of the torsional damper in accordance with the invention.

However, in practice and for a value D'2 of the relative angular movement D between the aforementioned values D1 and D2, and thus prior to direct driving of the coaxial part A by the coaxial part B, the clearance J' which initially exists between the shoulder 32 on each of the elastically deformable arms 31 and the shoulder 33 on the corresponding shoulder member 40 is cancelled out (FIG. 8).

Consequently, from this value D'2 of the relative angular movement D, the elastically deformable arms 31 are loaded in tension and, deforming elastically in consequence of this, their effect is added to that of the elastic members 27, 27' which are already in action.

On the diagram in FIG. 9, the curve representing the corresponding operation is a straight line II' of which the slope, proportional to the combined stiffness, is greater than that of the previous straight line II.

Consequently, for the final value D2 of the relative angular movement D, the torque transmitted from the coaxial part B to the coaxial part A has a value C'2 which is higher than the previous value C2.

Thus the addition in accordance with the invention of elastically deformable arms 31 results in a significant increase in the torque transmission capacity of the torsional damper concerned, without any modification to its other component parts and for the same final value of the relative angular movement D.

Also, and other things being equal, the transmission of the additional torque from the coaxial part B to the coaxial part A is then effected elastically by the elastically deformable arms 31 and, as a consequence of this, none of the axial spacers 13 comes into contact with the hub flange 11, the circumferential dimensions of the openings 14 in the latter being made sufficient to this end, all the axial spacers 13 participate in the transmission of this additional torque, and none of them is subject to any tendency to bend, which is advantageous from the point of view of the service life of the assembly.

For operation of the assembly with decreasing torque, the torque between the coaxial parts A and B is reversed and a process similar to the previous one takes place.

However, in the embodiment shown in FIGS. 1 to 10, only the elastic members 27 initially and then the elastic members 27' have any effect.

It will be understood that in the preceding description, for reasons of simplification, no account has been taken of the well known phenomenon of hysteresis which, due to friction between the coaxial parts A and B, produces a difference between the values of the torque transmitted between the coaxial parts A and B when the relative angular movement between them is increasing and the torque transmitted between them when this relative angular movement is decreasing.

Figure 6:
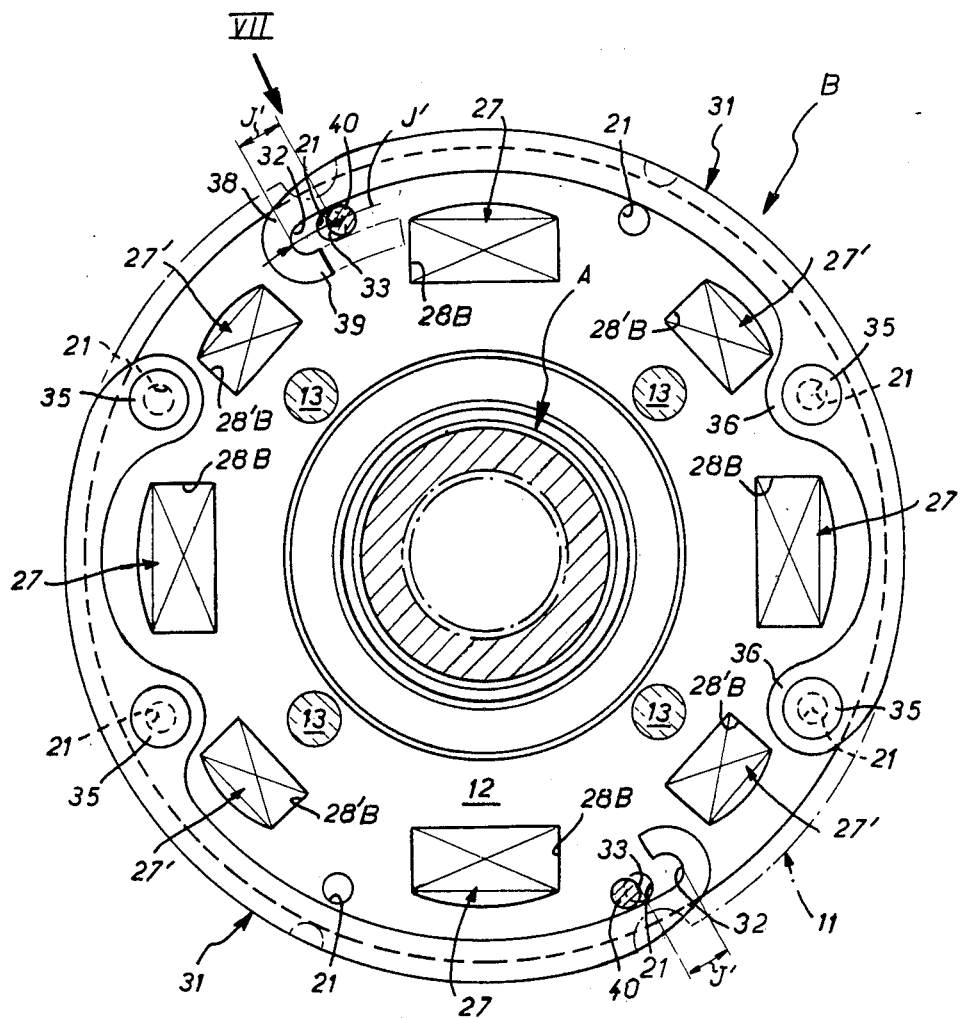
FIG. 6 is a view in transverse cross-section on the line VI—VI in FIG. 2 of the torsional damper in accordance with the invention, in a rest configuration thereof.

As represented schematically in dashed outline in FIG. 6, the circumferential tip 39 on the finger 36 of each of the elastically deformable arms 31 may be of sufficient extent to remain always in contact with, or at least in the immediate vicinity of, the corresponding shoulder member 40.

In other words, by virtue of a tip 39 of this kind, each of the elastically deformable arms 31 extends around the shoulder member 40 with which it is associated.

Thus the latter is with advantage able to retain it in the radial direction, opposing the centrifugal force to which it is subjected in service.

In the foregoing description it has been assumed that the elastically deformable arms 31 were attached to the guide ring 12 opposite that carrying the friction disk assembly 16 so that when they are operative the torque to be transmitted from the coaxial part A to the coaxial part B is transmitted through the axial spacers 13.

However, they could alternatively be attached to the guide ring 12 carrying the friction disk assembly 16, using the holes 21 in the latter and the rivets 20 attaching to it the disk 17 of said friction disk assembly 16.

In the case where the fixing of this disk 17 to this guide ring 12, assumed to be standardized, is effected by means of the axial spacers 13 and said disk 17 is consequently extended in the radial direction towards the axis of the assembly over the entire surface of said guide ring 12, its inside perimeter is preferably offset in the axial direction relative to its main part, in the manner of the guide ring 12, so that there is no risk of interference between the rivets 20 and the hub flange 11, in spite of the increased thickness due to the elastically deformable arm 31.

Likewise, in the foregoing description the usable part of each of the elastically deformable arms 31, that is to say the part of each elastically deformable arm 31 which extends from the end attached to the guide ring 12 which carries it to its free end, is of relatively great extent since, in practice, it extends over a sector containing both an elastic member 27 and an elastic member 27'.

In an alternative arrangement (FIGS. 10 and 11) it extends over a smaller angular sector, containing only one elastic member, namely an elastic member 27.

In order to at least partially compensate for the resulting loss of elasticity, the finger 38 on each of the elastically deformable arms 31 is of greater radial extent than previously and the shoulder 32 provided on it for cooperation with the corresponding shoulder member 40 is disposed in the vicinity of its end, said shoulder member 40 being as a corollarr to this moved in the radial direction towards the axis of the assembly.

In the embodiment shown in FIG. 11, one of the radial extensions 36 which an elastically deformable arm 31 of this kind features for accommodating its fastening rivets 35, in practice that circumferentially nearer its free end, is itself moved in the radial direction towards the axis of the assembly, a special hole 21' being specifically provide for this purpose in the guide ring 12 concerned, for the rivet 35 to pass through, so that, a blind radial groove 42 being formed between it and the corresponding radial extension 36, the usable part of the elastically deformable arm extends circumferentially beyond the rivet 35 in question, being with advantage lengthened.

In either case, and as previously, each of the elastically deformable arms 31 is spaced from the openings 28A, 28B, 28'A and 28'B in the coaxial parts A and B and thus from the elastic members 27 and 27' with which it is associated, without risk of interference with the latter. Because of this it may with advantage constitute an optional fitting for the torsional damper concerned.

In the embodiment shown in FIGS. 12 and 13 the shoulder 32 on an elastically deformable arm 31 instead of being curved, with a circular contour, as previously, is substantially straight.

Also, exploiting the fact that it is formed on a relatively long finger 38 of an elastically deformable arm 31 of this kind, it extends generally obliquely relative to a radius of the assembly passing through its median part.

Consequently, when the elastically deformable arm 31 becomes engaged with the corresponding shoulder member 40, as part of the process described hereinabove, the shoulder member 40 bears initially on the end of the shoulder 32 on the elastically deformable arm 31 which is radially nearer the axis of the assembly (figure 13A). Then, the finger 38 sliding progressively over the shoulder member 40 and causing elastic deformation of the elastically deformable arm 31, it bears on a part of the shoulder 32 which is progressively radially further away from said axis.

Thus the elastically deformable arm 31 is progressively bent radially in the direction towards the axis of the assembly, resulting in a progressive decrease in its stiffness.

Also, the elasticity of the elastically deformable arm 31 is advantageously complemented by the inherent elasticity of the finger 38 of the latter, which while sliding in contact with the shoulder member 40 opens progressively and elastically.

In the embodiment shown in FIG. 14, in line with each of the rivets 35 by means of which each elastically deformable arm 31 is attached to the guide ring 12 which carries it, a spacer ring 45 is disposed axially between the elastically deformable arm 31 and the guide ring 12. This eliminates or at least minimizes the bending of the elastically deformable arm 31 normally required for it to cooperate with a part of the corresponding shoulder member 40 situated as close as possible to the hub flange 11.

In an embodiment which is not shown, exploiting this bending, friction means are similarly disposed axially between the free end of each of the elastically deformable arms 31 and the guide ring 12 to which the elastically deformable arm 31 is attached, for complementary hysteresis to be developed when the latter is operative.

These friction means may consist of a friction ring, for example, bonded either to the free end concerned or to the guide ring.

In the embodiments shown in FIGS. 15 to 22, each of the elastically deformable arms 31 is integral with a plate member 46 from which it is cut out, and this plate member 46 is inserted axially between the hub flange 11 and a guide ring 12, in practice and as previously that opposite the one carrying the friction disk assembly 16.

A plate member 46 of this kind extends to the vicinity of the hub 10.

Figure 19:
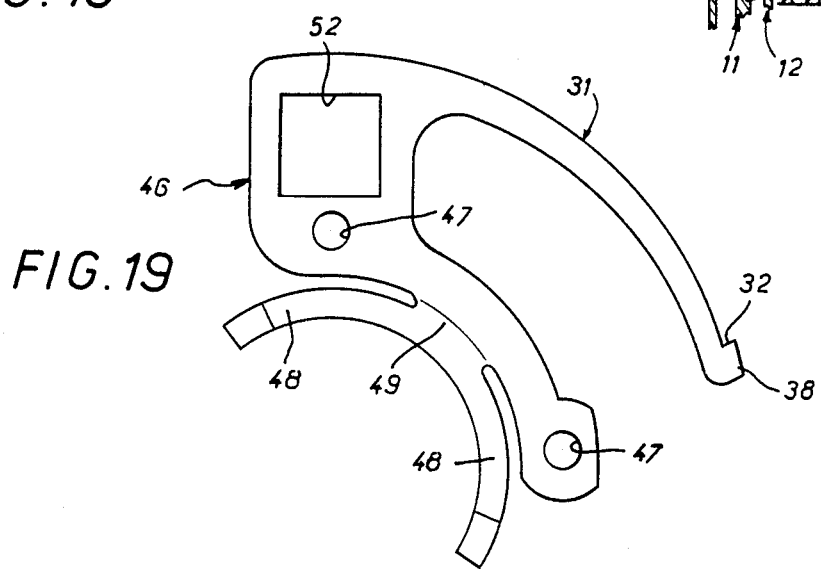
FIG. 19 is a view in elevation of an elastically deformable arm employed in this embodiment and of the plate member from which the latter is cut out in this embodiment.

There may be an individual plate member for each of the elastically deformable arm 31, as shown in FIGS. 19 to 21.

As an alternative (FIG. 22) the two plate members 46 from which are cut out the elastically deformable arms 31 employed may together constitute a single generally annular member 51.

Be this as it may, in these embodiments the fixing means attaching the elastically deformable arms 31 to the guide ring 12 which carries them are formed by certain at least of the axial spacers 13, the latter attaching to the guide ring 12 the plate members 46 from which are cut out said elastically deformable arms 31, said plate members 46 being formed for this purpose with holes 47 adapted to have said axial spacers 13 passed through them.

In practice, in the embodiments shown, this concerns all of the latter.

Be this as it may, the specific radial extent of the plate member 46 is exploited with advantage.

In accordance with one feature of the invention, it is also exploited to constitute axially acting elastic means associated with the friction rings 24, 25.

To this end, a plate member 46 preferably comprises, in its central area and as shown, at least one tang 48 integral with it which is bent so as to project from the plane of the plate member in the rest configuration, before it is placed between the hub flange 11 and the corresponding guide ring 12.

Once fitted, a tang 48 of this kind is subject to prestressing, whereupon the required axial clamping force is developed.

In the embodiment shown in FIGS. 15 to 19, two circumferential tangs 48 are provided in this way, extending in opposite circumferential directions from a common root area 49 through which they merge with the plate member which carries them.

An analogous arrangement is adopted in the embodiment shown in FIG. 22 in which the member 51 of which the two plate members 46 form part constitutes, in its median part, a circumferentially continuous ring 50. Four pairs of circumferential tangs 48 are provided.

In the embodiment shown in FIG. 20, the tang 48 which a plate member 46 thus features extends radially.

However, as will be understood and as is shown in FIG. 21, this plate member 46 could be without any such tangs 48.

Be this as it may, in line with the openings in the coaxial parts A and B corresponding to one of the elastic members 27, 27', in practice one elastic member 27' in the embodiment shown, the plate member 46 from which elastically deformable arm 31 is cut out itself features, registering with the aforementioned openings, an opening 52 which in practice has the same contour as the corresponding window 28'B in the guide rings 12 and by means of which it is engaged over the elastic member 27' concerned.

However, overall and as previously it is spaced from the openings 28A, 28B, 28'A and 28'B in the coaxial parts A and B and thus from the elastic members 27, 27' so that, not being in a position to interfere with the latter, it may with advantage constitute an optional fitting for the torsional damper concerned.

In the embodiments shown in FIGS. 15 to 21, the finger 38 provided at the free end of an elastically deformable arm 31 in order to constitute the shoulder 32 through which it must cooperate with a shoulder 33 provided for this purpose on the coaxial part B extends generally radially outwards.

It is also relatively short.

As a corollary to this, in these embodiments, the peg forming the shoulder member 40 on which is provided the shoulder 33 of the coaxial part B is formed by a right-angle upstand on a plate 54 which is attached, as by spot welding, for example, to the side of the hub flange 11 opposite that facing the guide ring 12 carrying the elastically deformable arm 31, this upstand on this plate 54 extending radially beyond the perimeter of said hub flange 11.

In practice, the resulting shoulder member 40 also extends radially beyond the radially outermost circumferential edge of the corresponding elastically deformable arm 31 so that it constitutes of itself retaining means for the latter adapted to counterbalance the centrifugal force to which is subjected in service.

However, as shown in FIG. 21, arrangements analogous to those described hereinabove may also be adopted.

In the foregoing description, and in relation to the direction of rotation concerned, the shoulder 32 on elastically deformable arm 31 stops short in the circumferential direction of that shoulder 33 on the shoulder member 40 with which it must become engaged so that, when it is operative, this elastically deformable arm 31 functions in tension, as described hereinabove.

Figure 23:
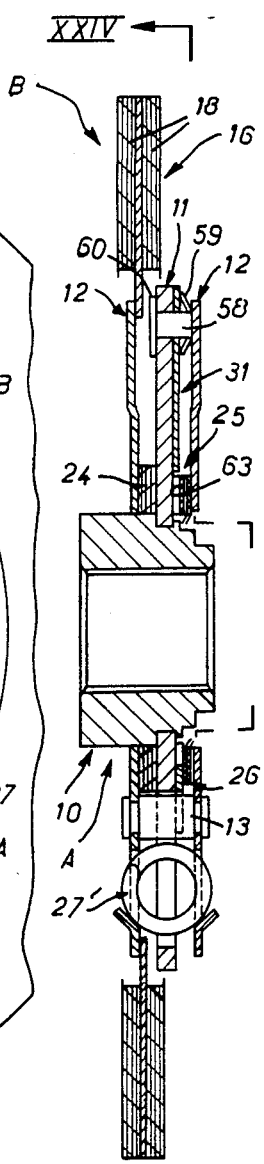
FIG. 23 is a view analogous to that of figure 2, in cross-section on the broken line XXIII—XXIII in FIG. 24, and relating to a further embodiment.

As an alternative to this and for the same direction of rotation, the shoulder 32 extends circumferentially beyond that shoulder 33 on the corresponding shoulder member, so that it functions in compression (FIG. 23, 24).

In the embodiment shown, the two elastically deformable arm 31 employed are attached to the hub flange 11, so that they are carried by the coaxial part A, and the shoulder member associated with each of them consists of one of the axial spacers 13 connecting together the guide rings 12, a shoulder member of this kind thus being constrained to rotate with the coaxial part B.

In practice, each of the elastically deformable arm 31 is attached to the hub flange 11 by a single peg 58 which passes through a hole formed for this purpose in the hub flange 11, in the vicinity of its perimeter, and on which the elastically deformable arm 31 is pivotally mounted.

Thus, although constrained to rotate with the hub flange 11 around the axis of the assembly, since it is attached to the latter, each of the elastically deformable arms 31 is mounted for local pivotal movement on this hub flange 11.

Each of the elastically deformable arms 31 is held against the hub flange 11 by an elastic ring 59 of the Belleville washer type, fixed to the corresponding peg 58 at its inside perimeter, which is subdivided for this purpose into radial fingers. On the side opposite said hub flange 11, the peg 58 has a head 60 for the latter to bear on (FIG. 23).

Thus each of the elastically deformable arms 31 extends generally radially and circumferentially, from the outside perimeter of the flange 11 to the inside perimeter of the latter, extending around the openings in the coaxial parts A and B and thus the corresponding elastic members 27, 27', without risk of interfering with the latter.

Thus as previously it may constitute an optional fitting for the torsional damper concerned.

In the vicinity of the hub 10, each of the elastically deformable arms 31 comprises a heel-piece 62 providing a reaction abutment for the latter.

In practice, and as shown here, a heel-piece 62 of this kind is disposed circumferentially beyond the shoulder 33 for an elastically deformable arm 31 formed by the axial spacer 13 with which it is associated.

Thus an elastically deformable arm 31 of this kind extends radially between the hub and this spacer 13, so that the latter extends radially beyond its radially outermost circumferential edge and thus constitutes for it retaining means adapted to counterbalance the centrifugal force to which it is subjected in service.

Conjointly, the finger 38 on which its shoulder 32 is formed projects radially outwards.

In practice, for locating the elastically deformable arms 31 in the vicinity of the hub 10 the friction ring 25 features two grooves 36 in diametrically opposite positions, one for each of the elastically deformable arms 31.

Also, in the embodiment shown, this friction ring 25 comprises radial arms 64 by means of which it is engaged on at least one of the axial spacers 13, to constrain it to rotate with the coaxial part B; in practice, in this embodiment, it is thus engaged with two axial spacers 13 in diametrically opposite positions.

Figure 24:
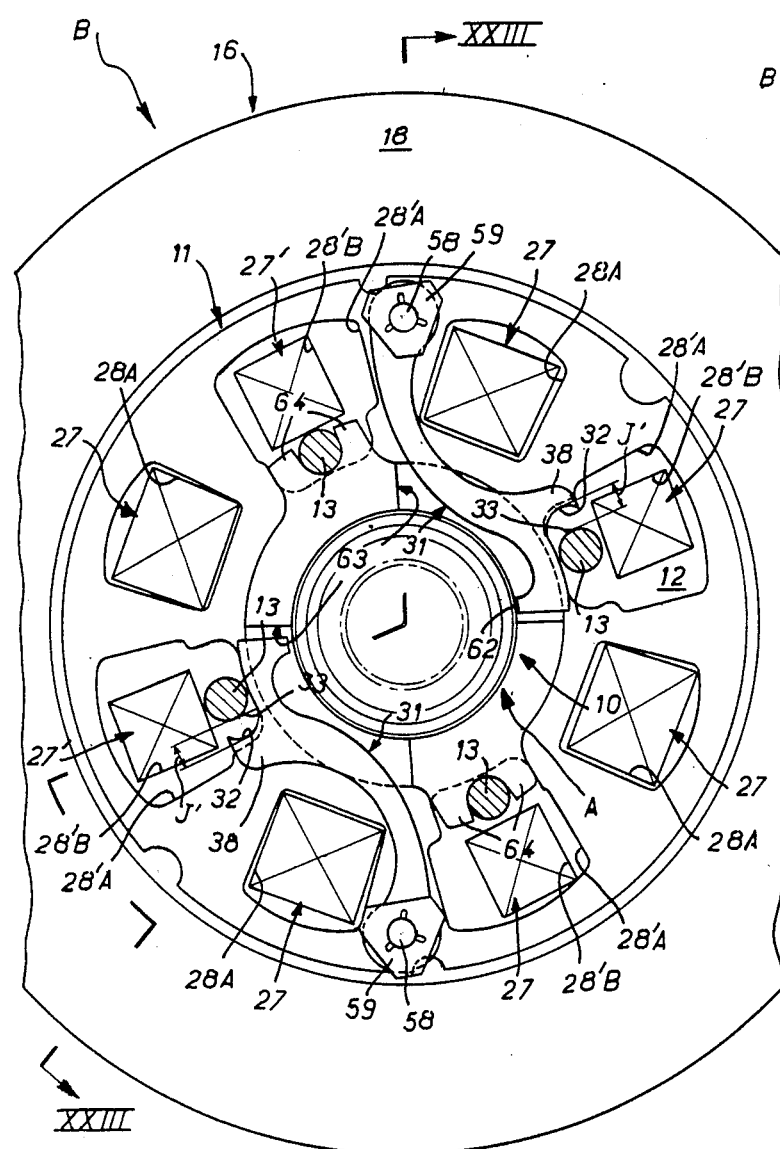
FIG. 24 is a partially cutaway partial view in elevation of this embodiment a seen on the line XXIV—XXIV in FIG. 23.

The embodiment shown in FIGS. 23 and 24 functions in a similar manner to that described previously.

However, as indicated, when the elastically deformable arms 31 come into action they function in compression, between the peg 58 on which they are engaged and the axial spacer 13 with which they are at this time in abutment relationship through their shoulder 32.

As will have been understood, the heel-piece 62 which they comprise makes it possible to ensure that they function over their full length and under appropriate conditions, bearing on the hub 10 only beyond the corresponding axial spacers 13.

In the embodiment shown in FIGS. 25 to 27, the elastically deformable arms 31 employed, of which only one is visible in the figures, operate in tension as in the embodiments shown in FIGS. 1 to 22.

However, as in the embodiment shown in figures 23 and 24, they are each mounted rotably on the hub flange 11, by means of a peg 58.

For the purposes of cooperation with the shoulder 32 which the elastically deformable arm 31 features, the coaxial part B, as previously, has an axially projecting shoulder member 40 on which the corresponding shoulder 33 is formed.

In the embodiment shown, this shoulder member 40 is formed by a right-angle upstand on a plate 68 attached, as by spot welding, for example, to the outside surface of the guide ring 12 on the relevant side of the hub flange 11, said right-angle upstand extending axially towards the other guide ring 12.

For preference and as shown here, the finger 38 of an elastically deformable arm 31 on which is formed the shoulder 32 of the latter being directed radially outwards, the shoulder member 40 associated with it extends beyond the outermost circumferential edge of the elastically deformable arm 31, so as to counterbalance the centrifugal force to which the latter is subjected in service.

It will be understood that various changes in the details, materials and arrangements of parts, which have been herein described and illustrated in order to explain the nature of the invention, may be made by those skilled in the art within the principle and scope of the invention as expressed in the appended claims.

For example, the circumferentially acting elastic means disposed between the two coaxial parts concerned may constitute, in a manner known per se, a plurality of different stages of relatively higher stiffness, the intervention of which is modulated during relative angular movement between said coaxial parts, and/or one or more elastically deformable arms may intervene for either or both rotation directions.

As an alternative, or in combination therewith, the hub flange may be provided with one or more elastically deformable arms on each side.

In all cases there may be provided one or more elastically deformable arms designed to function with the torque increasing and one or more elastically deformable arms designed to function with the torque decreasing, possible with different stiffnesses, for the purpose, for example and if required, of providing a high value of motor braking torque when the torque is decreasing.

Also, the scope for application of the invention is not limited to the case where only two coaxial parts are employed, but extends also to the case where there are more coaxial parts mounted so as to rotate relative to one another in pairs.

We claim:

1. A torsional damper suitable for use in a friction clutch plate, said torsional damper comprising at least two coaxial parts mounted to rotate relative to one another within a defined range of relative angular movement, a first of said coaxial parts including two annular flanges disposed in spaced parallel relation, circumferentially acting elastic means between said coaxial parts resisting such relative angular movement over at least part of said defined range of relative angular movement and incorporating at least one elastically deformable arm which extends in a substantially circumferential direction, means for mounting said at least one elastically deformable arm at a first end thereof on a first of said annular flanges of said first coaxial part, said at least one elastically deformable arm being unsupported at a second end, a first shoulder on said second end of said at least one elastically deformable arm, and a second shoulder on a second of said coaxial parts engageable with said first shoulder for rendering said at least one elastically deformable arm operative, and a friction disk attached to said first coaxial part.

2. A torsional damper according to claim 1, wherein said means for mounting said at least one elastically deformable arm comprises at least two circumferentially spaced fixing means on said first annular flange for supporting said at least one elastically deformable arm on said first annular flange.

3. A torsional damper according to claim 1, wherein said first shoulder is formed on an elongate finger on said at least one elastically deformable arm, said elongate finger extending generally obliquely to a radial line passing through said finger midway between said at least one elastically deformable arm and said first shoulder.

4. A torsional damper according to claim 1, wherein said second coaxial part comprises at least one other annular flange, said second shoulder being attached to and projecting axially from said at least one other annular flange.

5. A torsional damper according to claim 4, wherein said second shoulder extends radially beyond the radially outermost circumferential edge of said at least one elastically deformable arm.

6. A torsional damper according to claim 1, wherein said at least one elastically deformable arm comprises a finger, said first shoulder forming a part of said finger, said finger extending in a generally radial direction, said finger having a hooked tip by virtue of which said at least one elastically deformable arm passes and is adapted to hook around said second shoulder.

7. A torsional damper according to claim 1, wherein said circumferentially acting elastic means further comprises elastic members, and said coaxial parts including said annular flanges incorporate registering openings accommodating said elastic members, said openings being spaced from said at least one elastically deformable arm to prevent contact between said at least one elastically deformable arm and said elastic members.

8. A torsional damper according to claim 1, wherein said circumferentially acting elastic means further comprise elastic members and said coaxial parts including said annular flanges incorporate registering openings accommodating said elastic members, and said at least one elastically deformable arm being defined in a cutout plate member incorporating at least one opening registering with said openings in said coaxial parts.

9. A torsional damper according to claim 1, wherein said at least one elastically deformable arm is defined in a cutout plate member, said plate member incorporating an integral tang which is bent so that when said plate member is unstressed it projects out of the plane of said plate member, thereby constituting axially acting elastic means.

10. A torsional damper according to claim 1, wherein said at least one elastically deformable arm is defined in a cutout plate member and spaced axial spacers attaching said two annular flanges together, at least some of said spaced axial spacers also attaching said plate member to one of said annular flanges, thereby constituting said means for mounting said at least one elastically deformable arm to said first annular flange.

11. A torsional damper according to claim 1, having a rest position in which said first shoulder is disposed circumferentially beyond said second shoulder relative to said means for mounting said at least one elastically deformable arm so that in the course of relative angular movement in the defined range the said at least one elastically deformable arm acts in tension.

12. A torsional damper according to claim 1, further comprising spacing means between said at least one elastically deformable arm and said first annular flange, in line with said fixing means attaching said at least one elastically deformable arm to said first annular flange.

13. A torsional damper suitable for use in a friction clutch, comprising at least two coaxial parts mounted to rotate relative to one another within a defined range of relative angular movement, at least one annular flange on a first of said coaxial parts, circumferentially acting elastic means between said coaxial parts resisting such relative angular movement over at least part of said defined range of relative angular movement and incorporating at least one elastically deformable arm which extends in a substantially circumferential direction, which is supported at a first end on said annular flange of said first coaxial part and which is unsupported at its second end, a first shoulder on said second end of said at least one elastically deformable arm, and a second shoulder on a second of said coaxial parts with which said first shoulder is adapted to engage, said first coaxial part including two identical spaced parallel annular flanges which incorporate circumferentially spaced holes adapted to have respective fixing means pass through them and said at least one elastically deformable arm is attached to a first of said annular flanges by means of at least one of said holes, further comprising a friction disk attached to the second of said annular flanges by means of said holes.

* * * * *